US011702179B2

(12) United States Patent
Gonring

(10) Patent No.: US 11,702,179 B2
(45) Date of Patent: *Jul. 18, 2023

(54) CONFIGURABLE REMOTE CONTROL SYSTEM AND METHOD FOR A MARINE VESSEL

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/334,261

(22) Filed: May 28, 2021

(65) Prior Publication Data

US 2021/0284313 A1    Sep. 16, 2021

Related U.S. Application Data

(63) Continuation of application No. 16/210,698, filed on Dec. 5, 2018, now Pat. No. 11,046,410.

(51) Int. Cl.
*B63H 21/21* (2006.01)
*B60R 25/04* (2013.01)
(Continued)

(52) U.S. Cl.
CPC ............. *B63H 21/21* (2013.01); *B60R 25/04* (2013.01); *G07C 9/00309* (2013.01);
(Continued)

(58) Field of Classification Search
CPC .................................................... H05B 47/19
See application file for complete search history.

(56) References Cited

U.S. PATENT DOCUMENTS 4,250,358 A    2/1981 Gilbertson
4,809,199 A    2/1989 Burgess et al.
(Continued)

FOREIGN PATENT DOCUMENTS

GB    2559249 A    8/2018
WO    03045742 A1    6/2003

OTHER PUBLICATIONS

Mectronx, Smartphone Marine Ignition System, www.mectronx.com.
European search report dated Apr. 14, 2020 in counterpart European Patent Application 19212916.1.

*Primary Examiner* — Joseph H Feild
*Assistant Examiner* — Pameshanand Mahase
(74) *Attorney, Agent, or Firm* — Andrus Intellectual Property Law, LLP

(57) ABSTRACT

A remote control system for a marine vessel includes at least one fob and a configuration control system configured to detect available devices on the marine vessel to be controlled remotely for the marine vessel, generate a list of available functions for at least one user-selectable fob command based on the detected available devices, present the list of available functions to the user via a fob configuration user interface such that the user can select one or more functions in the list of available functions, identify a system command associated with each selected function so as to configure a set of system commands based on the user-selected functions, and store the user-configured set of system commands in association with the fob identification and the selected fob command. The system further includes a helm transceiver module to effectuate activation/deactivation of the available devices based on the user-configured set of system commands.

20 Claims, 4 Drawing Sheets

(51) Int. Cl.
  *G08C 17/02* (2006.01)
  *H05B 47/19* (2020.01)
  *G07C 9/00* (2020.01)
  *B63B 17/00* (2006.01)

(52) U.S. Cl.
  CPC . *B60R 2025/0405* (2013.01); *B60R 2325/304* (2013.01); *B63B 2017/0009* (2013.01); *G07C 2009/00547* (2013.01)

(56) References Cited

U.S. PATENT DOCUMENTS

| | | |
|---|---|---|
| 6,799,546 B1 | 10/2004 | Gonring et al. |
| 7,081,028 B1 | 7/2006 | Crane |
| 7,355,518 B1 | 4/2008 | Staerzl |
| 9,284,032 B1 * | 3/2016 | Snyder ................ B60R 25/04 |
| 9,695,764 B1 | 7/2017 | Christiansen et al. |
| 11,046,410 B2 * | 6/2021 | Gonring ................ G08C 17/02 |
| 2001/0050619 A1 | 12/2001 | Wiggerman et al. |
| 2003/0120831 A1 * | 6/2003 | Dubil ................ H04N 21/6125 348/E7.071 |
| 2005/0272372 A1 | 12/2005 | Rodriguez |
| 2010/0049386 A1 | 2/2010 | Bamba |
| 2011/0208359 A1 | 8/2011 | Duchene et al. |
| 2016/0055699 A1 * | 2/2016 | Vincenti ................ H04W 12/04 340/5.61 |
| 2016/0320469 A1 | 11/2016 | Laifenfeld et al. |
| 2017/0236344 A1 | 8/2017 | Murar et al. |
| 2017/0358159 A1 | 12/2017 | Hanson et al. |
| 2019/0047512 A1 * | 2/2019 | Gersabeck ............ B60R 25/24 |
| 2019/0308614 A1 * | 10/2019 | Lavoie ................ B60R 25/245 |

* cited by examiner

CONFIGURABLE REMOTE CONTROL SYSTEM AND METHOD FOR A MARINE VESSEL

CROSS REFERENCE TO RELATED APPLICATION

The present application is a continuation of U.S. application Ser. No. 16/210,698, filed Dec. 5, 2018, which application is hereby incorporated by reference in its entirety.

FIELD

The present disclosure generally relates to remote control systems for marine vessels, and more particularly to remote control systems utilizing fobs to remotely control devices and systems on a marine vessel, wherein the functionality executed by a command sent from the fob is configurable by a user.

BACKGROUND

The following U.S. Patents and Applications provide background information and are incorporated herein by reference in entirety.

U.S. Pat. No. 4,809,199 discloses a keyless marine access and engine control system. The system is caused to change from a dormant state to an enabled state when a sequence of actuation signals entered through a keypad matches data representing either one of two access sequences stored in the system's memory. When the system is in its enabled state, the system responds only to signals representing a keypad actuation exceeding a first predetermined time interval. These signals are used to crank, choke, and stop a marine vehicle engine. The secondary access sequence can be changed by a person who knows either the primary access sequence or the secondary access sequence, while the primary access sequence can be changed only by a person having knowledge of the present primary access sequence. In order to reprogram either access sequence, a programming button must be actuated for a predetermined time interval exceeding the first time interval. The system can be used with either a single or dual engine installation.

U.S. Pat. No. 6,799,546 discloses a method for starting a marine internal combustion engine is independent of a continued signal received from a starting switch. If the operator of the marine vessel momentarily depresses a starting switch, a predetermined procedure is followed by a microprocessor which does not require continued involvement of the marine vessel operator. Various parameters are checked during the starting sequence and various actuators are activated to assure a safe and reliable starting procedure.

U.S. Pat. No. 9,284,032 discloses a control system and method for deterring theft of a marine vessel. A security control circuit receives a transponder identification code from a transponder. The engine control circuit has a status that is based on a comparison of a stored identification code with the transponder identification code. The status of the engine control circuit is locked if the stored identification code does not match the transponder identification code and the status of the engine control circuit is unlocked if the stored identification code does match the transponder identification code. The security control circuit determines an arbitrated lock status of the control system based on a conjunctive analysis of the locked and unlocked statuses of a plurality of engine control circuits connected to a network bus, and indicates the arbitrated lock status to an operator of the marine vessel.

U.S. Pat. No. 9,695,764 discloses a marine drive system includes an engine, a fuel system that provides at least two different fuels to the engine, and a fuel selection means for selecting a fuel type. A control unit accesses a set of fuel-specific operating parameters based on the selected fuel type and controls the engine based on the set of fuel-specific operating parameters.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a remote control system for a marine vessel includes at least one fob configured to communicate with a helm transceiver module on the marine vessel. The fob has at least two user inputs, each associated with a different user-selectable fob command, wherein the fob is configured to wirelessly transmit a fob identification and a selected fob command for the marine vessel in response to user selection of the respective user input. The helm transceiver module is configured to store unique fob identifications for permitted fobs and a set of system commands for each user-selectable fob command associated with each fob identification, wherein the set of system commands are configurable by a user. Upon receipt of the fob identification and the selected fob command, the helm transceiver module verifies that the fob identification is associated with one of the permitted fobs and identifies the user-configured set of system commands associated with the selected fob command and the fob identification. The helm transceiver module then communicates instructions via a vessel network based on the user-configured set of system commands to activate or deactivate devices on the marine vessel.

One embodiment of a method of operating a remote control system for a marine vessel includes storing, in a memory of a helm transceiver module, a unique fob identification for each of one or more permitted fobs. A set of system commands are received in association with each of at least one user-selectable fob command for each of the permitted fobs, wherein the set of system commands are configured by a user and transmitted to the helm transceiver module. The set of system commands are stored in the memory of the helm transceiver module in association with the respective fob identification and a user-selectable fob command. Upon receipt of a fob identification and a selected fob command from a fob, the helm transceiver module verifies that the fob identification is associated with one of the permitted fobs, and then identifies the set of system commands associated with the selected fob command and the fob identification. The helm transceiver module communicates instructions via a vessel network based on the set of system commands to activate or deactivate devices on the marine vessel.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
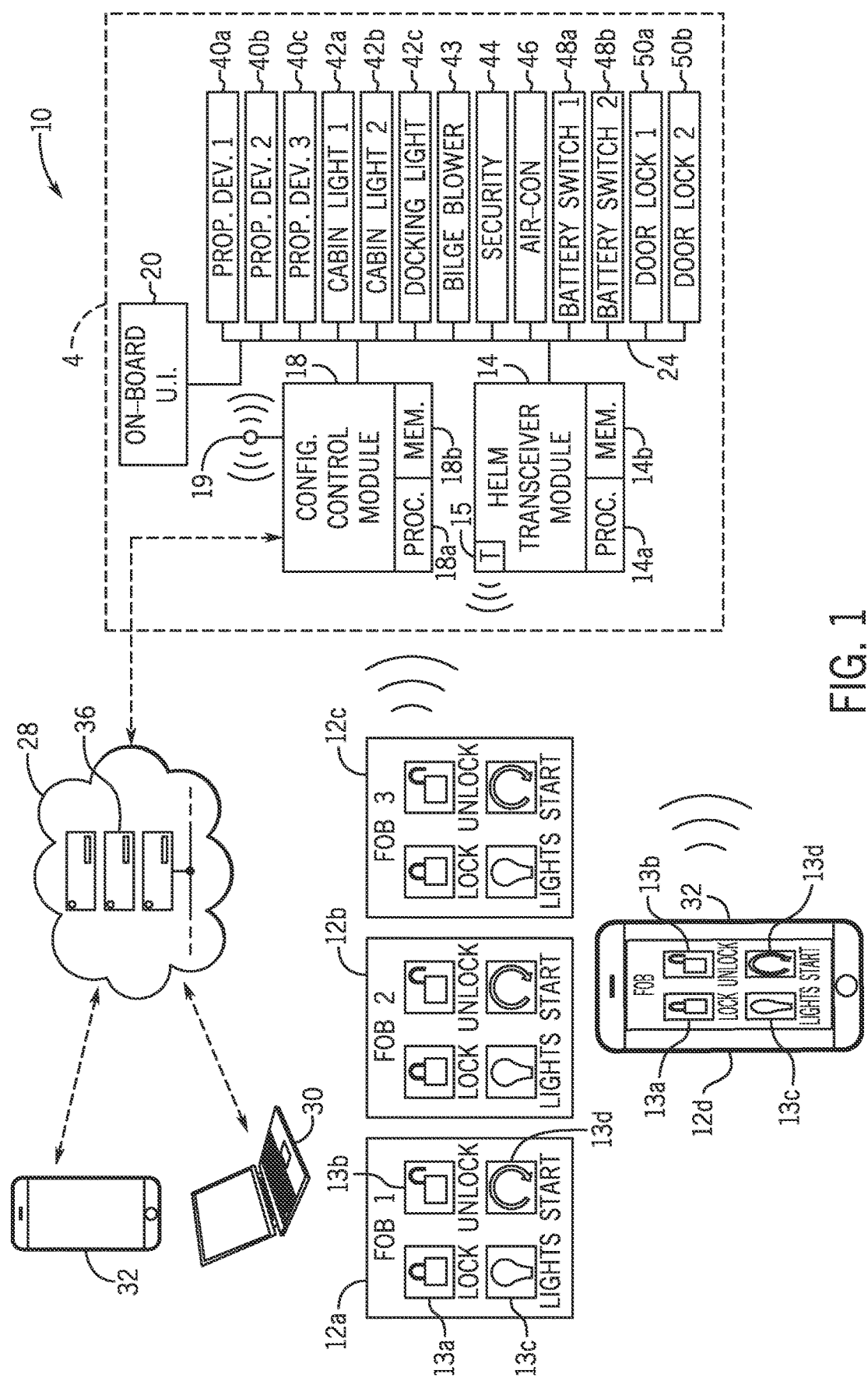
FIG. 1 schematically depicts one embodiment of a remote control system for a marine vessel.

Existing remote control fobs for marine vessels and other vehicles generally employ a pre-set functionality. The inventors have recognized that one of the challenges for developing fob system for a marine vessel is that the configuration of marine vessels is highly variable. Thus, a single fob configuration will not be usable across the wide variety of vessel propulsion platforms and configurations. Namely, the variety of vessel configuration and system customizations employed across vessel fleets make it difficult to design to design a single remote control fob solution that fits all marine vessel configurations. Moreover, the low volume of each marine vessel variant makes creating unique fobs for each variant impractical. Furthermore, the inventors have recognized that marine vessels are incorporating increasing numbers of on-board systems, making the marine vessels more difficult to operate and more prone to error. For example, systems may not be fully shut down as part of a shutdown procedure on the marine vessel, and thus systems may be accidentally left on, which may drain the battery of the marine vessel or be otherwise problematic. Conversely, systems may be left off that should have been turned on, such as security systems or automatic bilge pump systems, thus leaving the unattended marine vessel vulnerable.

Upon recognition of the foregoing problems and challenges and based on their experimentation and research in the relevant field, the present inventors developed the disclosed remote control system for marine vessels that allow customization of instructions associated with a fob signal to better fit the need of each marine vessel. Furthermore, the inventors have developed a system that simplifies the start up and shut down procedures for vessel systems, where multiple startup and shut down procedures can be associated and executed by a single button press on a remote control fob, allowing a user to easily approach and activate various systems on a marine vessel or shut down various systems and leave the marine vessel with a single button press. Additionally, the inventors developed a system that allows multiple different permitted fobs to be assigned multiple different configurations, thus allowing customized control functionality based on individual user preferences or based on different operation environments or scenarios.

The disclosed system allows use of a fob providing basic or typical functionality (e.g., lock, unlock, start), but also offers the ability to change or add functionality based on user preference and the configuration of a particular marine vessel. In one embodiment, available features on the marine vessel, such as on the vessel control network, are detected and a list of possible functionalities that could be associated with each button on a fob is automatically generated and provided to a user via a user interface such that the user can select which functions they want to associate with each button on the fob. In various embodiments, the functionality associated with each fob button may be added or changed by a user using a smartphone, PC, or on-board user interface.

FIG. 1 depicts one embodiment of a remote control system 10 for controlling various devices and systems on a marine vessel 4. The system includes one or more fobs 12, which in the depicted embodiment is four fobs 12a-12d. The fobs 12a-12d wirelessly communicate with a helm transceiver module 14. Each fob 12a-12d includes one or more user inputs 13, such as buttons 13a-13d, selectable by a user to control certain functionality on the marine vessel 4. Each user input 13 is selectable to cause the fob 12 to wirelessly transmit a specific user-selectable fob command, which is received at the helm transceiver module 14 and associated with the user-configured functionality. In certain embodiments, the fobs 12a-12d may be a dedicated device with physical buttons, such as a standard fob device, or one or more of the fobs 12a-12d may be a smartphone 32 or pc 30 running an application that causes the computer to perform like a fob to provide user inputs and, upon selection of one of the user inputs, transmit the selected fob command. For example, the fobs 12a-12d may be configured to communicate with the helm transceiver module 14 via any one or more wireless protocols, examples of which include Bluetooth, Bluetooth Low Energy (BLE), ANT, and ZigBee.

In the depicted embodiment, the user inputs 13 include a lock button 13a, an unlock button 13b, a lights button 13c, and a start button 13d. Each fob 12a-12d is assigned a unique fob identification, such as a numeric or alphanumeric code, which identifies that particular fob within the system 10. Upon depression of a button by the user, the fob 12a-12d wirelessly transmits its fob identification and a code communicating the selected fob command—i.e., a code associated with the button press—which also may be a numeric or alphanumeric code. In certain embodiments, multiple user-selectable fob commands may be associated with a single button 13a-13d or other user input element, wherein the selected fob command is based on the pattern of the button press. For example, a single button press may generate one user-selectable fob command, a double button press may be another, and a button hold maybe still a third user-selectable fob command generatable by pressing a particular button. The helm transceiver module 14 is configured to communicate with the fobs 12a-12d, and thus to receive the unique fob identifications and to interpret the transmitted fob command from the respective fob 12a-12d. The helm transceiver module 14 is further configured to verify that any received fob identifications are associated with one or more permitted fobs that the helm transceiver module 14 is configured to communicate with—i.e., the received fob identification matches one that is stored in memory of the helm transceiver module 14 as a permitted fob.

The helm transceiver module 14 includes a transceiver 15 configured to receive wireless transmissions from the fobs 12a-12d. Each fob 12a-12d includes a transmitter or a transceiver (not shown for visual clarity) correspondingly configured to communicate with the transceiver 15 of the helm transceiver module 14. The helm transceiver module 14 further includes a processing system 14a and a storage system 14b providing memory for storing software for storing and executing the various system commands per the user's configuration of the remote control system.

The helm transceiver module 14 is further configured to receive the selected fob commands emitted by the fobs 12a-12d in response to one of the buttons 13a-13d being pressed, and to carry out a set of system commands associated with that selected fob command for that particular fob 12a-12d. To accomplish this, the helm transceiver module is configured to store a set of system commands for each user-selectable fob command for each permitted fob 12a-

12d— e.g., in association with each unique fob identification that the helm transceiver module 14 is configured to recognize. The set of system commands are configurable by a user in order to control the functionality associated with each button 13a-13d on each fob 12a-12d.

In one embodiment, the set of system commands associated with each user-selectable fob command (e.g. the command generated by depressing each button 13a-13d) is configured by a user via a user interface computer providing a user interface that allows the user to select from a list of available functions in order to generate the sets of system commands. In various embodiments, the user interface computer may be any of various computing devices running an application for configuring the fob operation, such as a personal computer (PC) 30, a smartphone 32, or an on-board user interface (20) computing system installed on a marine vessel 4.

In the embodiment depicted in FIG. 1, a configuration control module 18 interfaces with the user interface computers 30, 32, 20 in order to allow configuration of the set of system commands associated with each user-selectable fob command for each fob 12a-12d. The configuration control module 18 includes a processor 18a and a storage system 18b, which includes memory that stores a list of available functions and certain configuration software. The configuration software includes instructions executable to, upon receipt of user selections of available functions, determine and associate a set of system commands with each user-selectable fob command or each permitted fob 12a-12d accordingly. In certain embodiments, the configuration control module 18 may be a helm module or a command control module of a marine vessel, and thus configured to perform a multitude of functionalities relating to a multitude of systems on the marine vessel 4. In other embodiments it may be a dedicated controller for the remote control system 10. The configuration control module 18 may then communicate the set of system commands to the helm transceiver module 14, which may store them in memory 14b.

The configuration control module 18 and the helm transceiver module 14 may communicate with one another via the vessel network 24. In various embodiments the vessel network 24 communicatively connects to various modules 14, 18 and devices 40-50 on the marine vessel, providing a communication link therebetween. For example, the vessel network 24 may comprise a controller area network (CAN) bus, which is a vehicle bus standard that allows microcontrollers and devices to communicate with one another without a host computer. The CAN bus may be a physical communication link between the various embodiments or may include devices having wireless CAN interfaces, such as an established wireless local area network (WLAN), a Bluetooth data transfer network, or other wireless communication protocol and infrastructure. In still other embodiments, the vessel network 24 may comprise a combination of wired and wireless communication connections between the various modules and devices. It should be noted that the communication link lines representing the network 24 are meant only to demonstrate that the various control elements and devices are capable of communicating with one another, and do not necessarily represent actual wiring connections or pads between the various elements, nor do they represent the only paths of communication between the elements.

In the depicted embodiment, the configuration control module 18 is a separate device communicatively connected to the helm transceiver module 14 via the vessel network 24. In other embodiments, the configuration control module 18 and the helm transceiver module 14 may have a dedicated communication connection therebetween. The configuration control module 18 includes a processing system 18a and a storage system 18b storing software executable on the processing system 18a, such as to execute the configuration methods described herein. The configuration control module 18 may further include various interface devices, such as one or more wireless transceivers, CAN transceivers, etc. for communicating with other devices via the vessel network 24 or other wireless networks. The configuration control module 18 may also include a sim card, for example, providing a cellular interface 19 enabling communication on the cellular network. User interface computers, such as PC 30 and/or smartphone 32 operating software application(s) for configuring the remote control system, may then communicate with the configuration control module 18 via a remote interface network 28, such as a cloud computing network 36 hosting software for management of multiple systems on a marine vessel, such as a telematics interface, whereby users can monitor the status of various systems on their marine vessel as well as control various settings. The remote interface network 28 may host the configuration software for the remote control system such that the user can run such software via the user interface computer 30, 32 in order to configure the settings for each fob 12a-12d—i.e., select the sets of system commands to be associated with each permitted fob 12a-12d. In certain embodiments, the sets of system commands associated with each permitted fob 12a-12d may be determined and/or stored in the cloud computing system 36 of the remote interface network 28, and may be communicated to the configuration control module 18 or directly to the helm transceiver module 14. Thus, the system 10 may be configured to facilitate remote configuration by a user, permitting the user to manipulate the set of system commands associated with any of the user-selectable fob commands for one or more of the fobs 12a-12d remotely via interaction between the user interface computer 30, 32 and the remote interface network 28.

In other embodiments, the configuration control module 18 may not be configured for cellular communication, and may instead only be configurable via communication by one or more user interface computers 30, 32 on the vessel network 24 or via an on-board user interface 20, which may be controlled by and connected directly to the configuration control module 18 or may be a stand-alone computing device connected to the configuration control module 18 via the vessel network 24. For example, the on-board user interface may be a user interface display installed at the helm of the marine vessel 4. In other embodiments, the on-board user interface 20 may comprise part of an on-board management computing system, such as VesselView by Mercury Marine Corporation of Fond Du Lac, Wis.

While the exemplary embodiment shown in FIG. 1 provides a separate helm transceiver 14 and configuration control module 18, a person of ordinary skill in the relevant art will understand in light of the present disclosure that such modules may be combined into a single hardware device with software providing functionalities described herein as attributed to each of the configuration control module 18 and the helm transceiver module 14. Thus, a single module may receive the fob identification and fob commands transmitted by fobs 12a-12d and may also interface with one or more user interface computers 20, 30, 32 in order to facilitate user configuration of the remote control system 10.

In certain embodiments, the system 10 may be configured such that available devices are detected on the vessel network 24 and the user interface automatically populates with a list of available functions based on the detected devices communicating on the vessel network 24. For example, the configuration control module 18 may be configured to identify the relevant devices available on the vessel network 24 and generate a list of available functions for each user-selectable fob command based on the detected available devices.

In the example depicted in FIG. 1, the configuration control module 18 is programmed to detect available devices on the vessel network 24, which includes propulsion devices 40a-40c, lights 42a-42c, a bilge blower 43, a security system 44, an air conditioning system 46, battery switches 48a, 48b, and door locks 50a-50b. Based on the available devices 40-50 detected on the vessel network 24, the configuration control module 18 generates a list of available functions for each user-selectable fob command (e.g. the fob command generated by each fob 12a-12d in response to depression of each button 13a-13d). The configuration control module then communicates with a user interface device (e.g., PC 30, smartphone 32, or on-board user interface 20) to display the list of available functions such that the user can select one or more functions that should be associated with the respective user-selectable fob command and the set of system commands is then generated accordingly such that the selected functions are carried out in response to receipt of a selected fob command.

Figure 2:
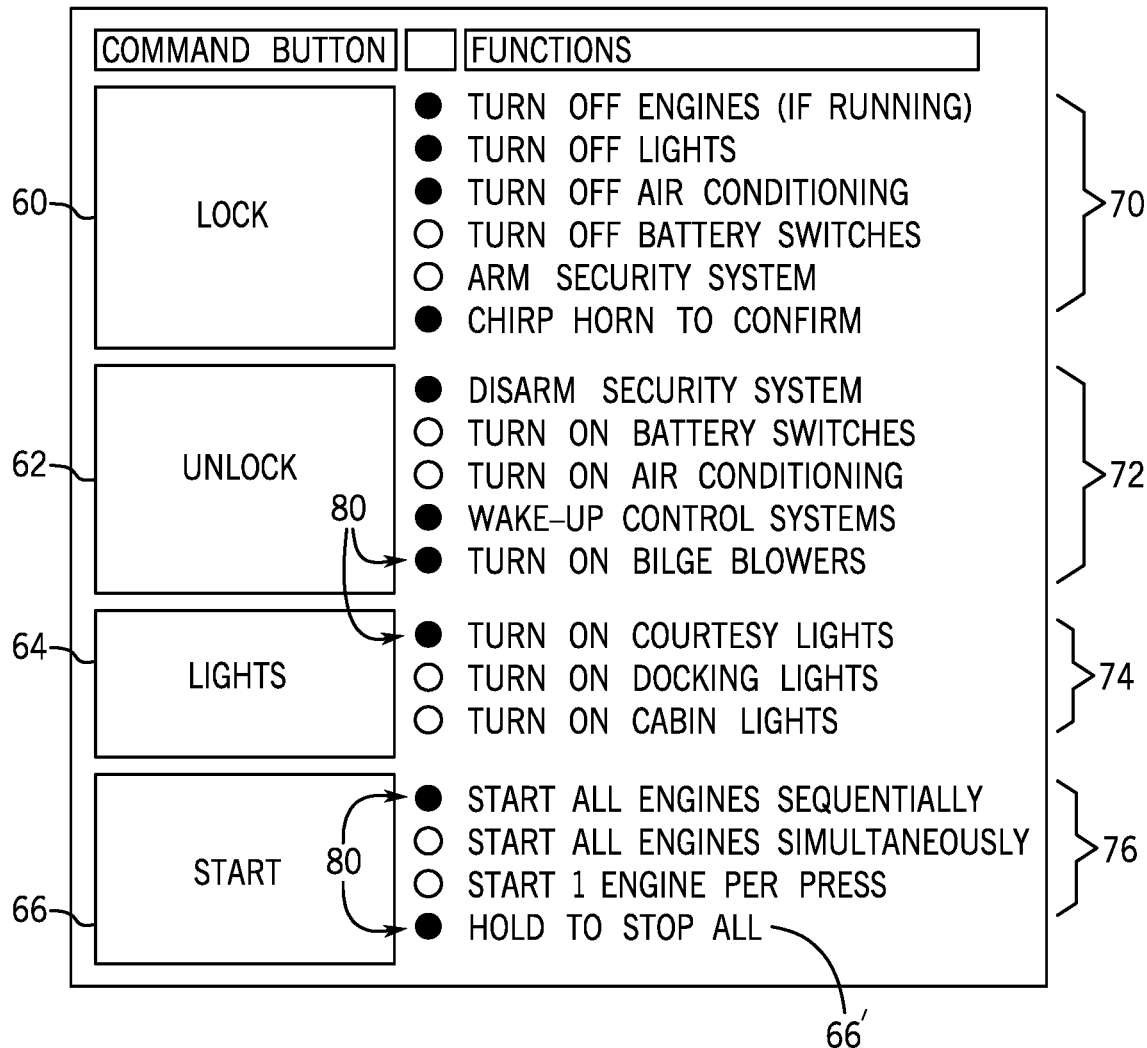
FIG. 2 demonstrates an exemplary user interface for configuring a remote control system for a marine vessel.

FIG. 2 depicts an exemplary user interface display provided on a user interface computer (e.g., PC 30, smartphone 32, or on-board user interface 20). The user interface display provides a list of available functions 70, 72, 74, 76 for each respective user-selectable fob command 60, 62, 64, 66. Each list of available functions 70, 72, 74, 76 is presented such that a user can select each of the available functions by selecting the corresponding checkbox 80 next to each listed available function for each user-selectable fob command 60, 62, 64, 66. A person having ordinary skill in the art will understand that the list of available functions may be presented in various ways to facilitate user selection of each function, such as via the use of buttons, switches, selectable graphics, etc.

For example, the user-selectable fob commands may include a lock command 60, an unlock command 62, a lights command 64, and a start command 66, which as described above are transmitted codes in response to user input (e.g., a press of the corresponding button 13a-13d). For example, such commands may be generated upon depression of each of the buttons 13a-13d on a permitted fob 12a-12d, respectively. In one embodiment, the lock command 60 may be associated with a set of system commands derived from the list of available functions 70, such as including a command to activate the security system 44, a command to shut down one or more propulsion devices (e.g. engines, if running) 40a-40c, a command to activate one or more bilge blowers 43, a command to activate one or more battery switches 48a-48b, a command to activate an air conditioning system 46, or a command to operate one or more door locks 50a-50b in order to unlock one or more cabin doors. The user may also configure the set of system commands associated with the unlock command 62. For example, the user-configured set of system commands associated with the unlock command 62 may be any two or more of a command to deactivate the security system 44, a command to activate one or more bilge blowers 43, a command to activate one or more battery switches 48a-48b, a command to activate the air conditioning system 46, and/or a command to operate door locks 50a-50b to unlock one or more cabin doors. In certain embodiments, the system 10 may also permit associating a system command to start one or more propulsion devices 40a-40c with the unlock fob command 62. In certain embodiments, the list of available functions for any given user-selectable fob command may also include an option to provide a confirmation that the respective fob command 60-66 is received and/or that the associated set of system commands is completed, such as a horn chirp or flashing a light to confirm that the set of system commands are executed, and thus that the user-selected functions have all been successfully completed in response to the selected fob command at the fob 12a-12d.

In certain embodiments, the user interface may be configured to only allow certain functions in the list of available functions to be selected in the alternative. In the example of FIG. 2, the functions of "start all engines sequentially" and "start all engines simultaneously" are selectable in the alternative, where user selection of one of those two functions automatically assigns a negative selection of, or deselects, the other listed function since the engines cannot be both started simultaneously and sequentially. While the functions associated with the start command 66 in FIG. 2 relate to engines, a person having ordinary skill in the art will understand that other propulsion devices may also be associated with such a command, such as to start or warm up a jet drive, pod drive, electric motor, etc.

The configuration control module 18, or in other embodiments the helm transceiver module 14, is configured to generate the list of available functions based on the available devices. For example, the module(s) 18 and/or 14 may store an all-encompassing master list of possible available functions for each user-selectable fob command across all vessel configurations. The module 18, 14 is then configured to generate the list of available functions 70, 72, 74, 76 for each user-selectable fob command from that master list of possible functions based on the available devices. For example, the configuration control module 18 may be configured to add "turn off air conditioning" to the list of available functions that may be associated with the lock command 60 and add "turn on air conditioning" to the list of available unlock commands 62 upon detecting that the air conditioning system 46 is available on the network bus. Similarly, an "arm security system" function may be added to the list of available functions for the lock command 60 and "disarm security system" function added to the list for the unlock command 62 upon detect of the security system 44 on the vessel network.

Alternatively, the module 18, 14 may be configured to categorize certain devices and functions with a particular user-selectable fob command and may generate the list accordingly. For example, all available lights detected on the network 24 may be associated with and included in the list of available functions 74 associated with the lights command 64. Similarly, all propulsion devices may be categorized and included in the list of available functions 76 associated with the start command 66, such that the user can select any of the propulsion devices 40a-40c, or a combination thereof, to associate with the start command 66.

The user interface may be configured to allow the user to select which functions are associated with the various user-selectable fob commands from a single button. The example at FIG. 2 illustrates this concept with respect to the start command 66, where a start button hold 66' (e.g. a button press of a threshold duration) is optionally associated with stopping all propulsion devices. Similarly, the helm transceiver module 14 may be configurable to interpret sequentially selected fob commands differently. For example, the set of system commands associated with the start command 66 may instruct that sequential start commands 66 are each interpreted to provide a different system command. In the example, if the user selects the "start one engine per press" function, then the set of system commands will be configured such that the first receipt of the start command 66 will start a first propulsion device 40*a*, a second receipt of the start command 66 will start the second propulsion device 40*b*, and receipt of a third start command 66 will start the third propulsion device 40*c*.

Figure 3:
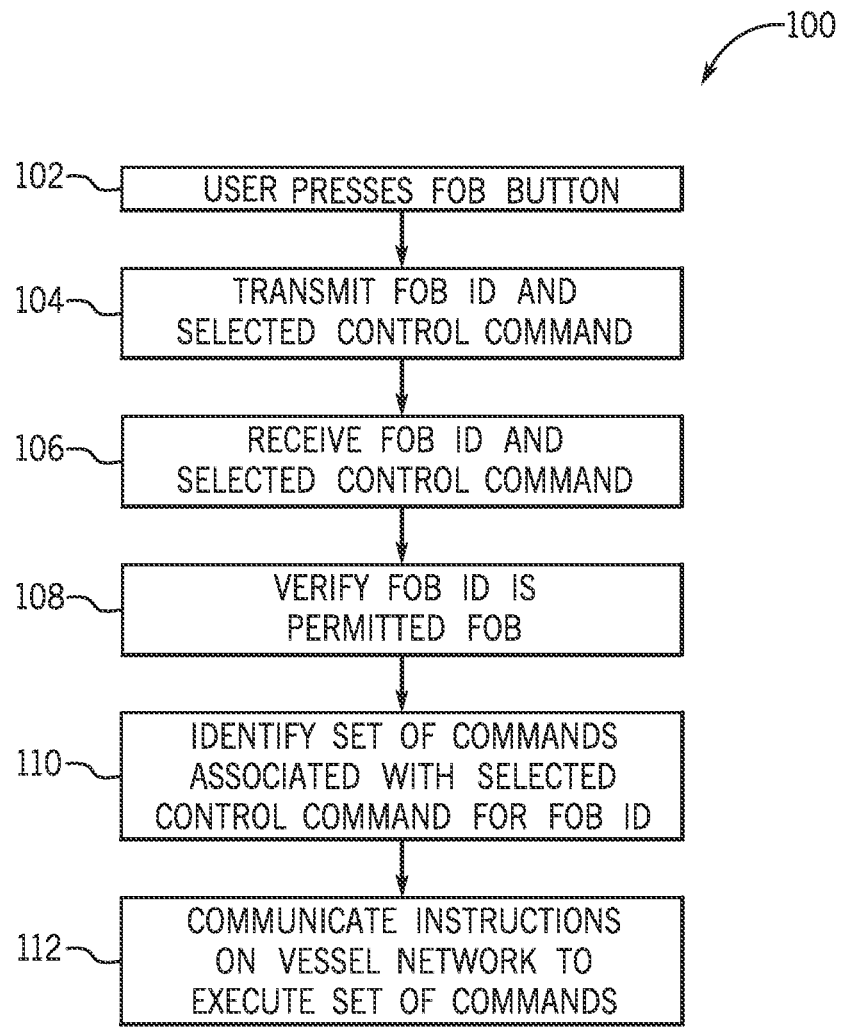
FIG. 3 is a flowchart depicting one embodiment of a method of operating a remote control system for a marine vessel.
Figure 4:
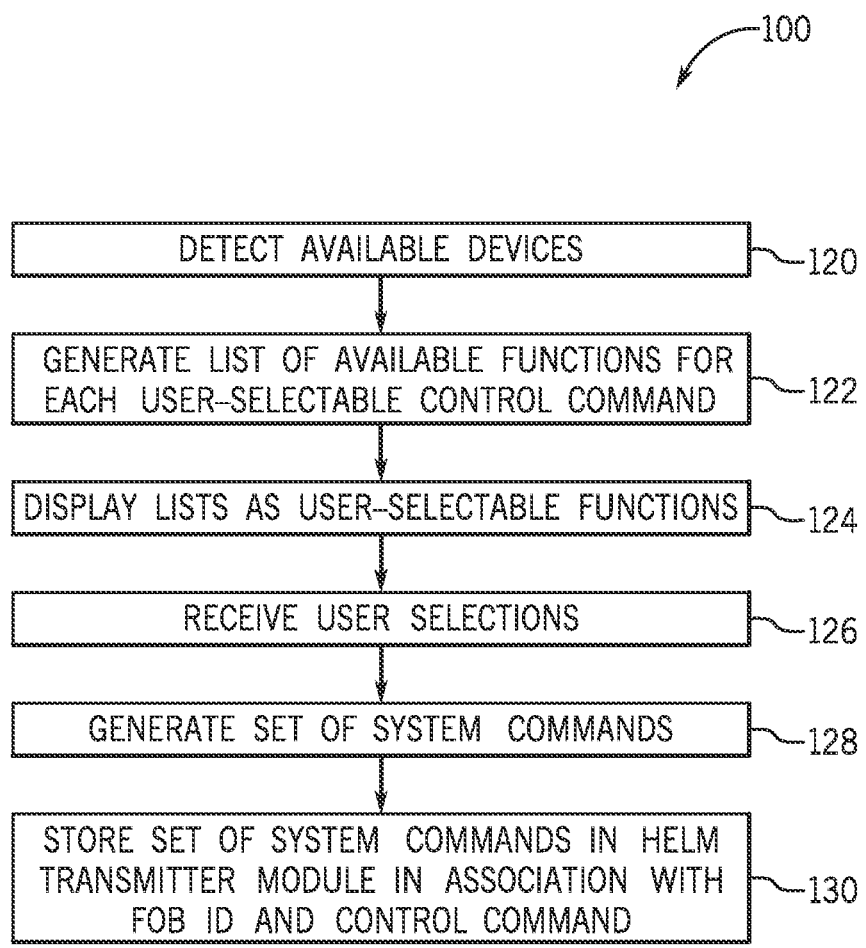
FIG. 4 depicts another embodiment of a method, or portion thereof, of operating a remote control system for a marine vessel.

FIGS. 3 and 4 depict embodiments of methods 100, or portions thereof, of operating a remote control system for a marine vessel in accordance with the present disclosure. FIG. 3 depicts exemplary steps that may be executed, such as by the helm transceiver 14, to carry out a user-selected set of commands upon receipt of a selected command from a fob. FIG. 4 depicts an exemplary set of steps that may be executed by the system 10 in order to facilitate user selection of functions in order to generate the set of system commands for each user-selectable fob commands.

Referring to FIG. 3, upon a user pressing a fob button (e.g., 13*a*-13*d*) at step 102 (e.g., on a dedicated fob device or on a smartphone 32 running a fob application), the fob transmits a unique fob ID and a selected fob command at step 104. The selected fob command is a wirelessly transmitted command, or code, associated with the pressed user interface element (in this embodiment button 13*a*-13*d*). As described above, the selected fob command may also communicate the pattern at which the fob button 13*a*-13*d* is depressed—e.g., a short press, a double press, or a button hold, to provide just a few examples. For example, the selected fob command may be a transmitted signal generated by the fob 12*a*-12*d* in response to each button press and for the full duration of the button press. The fob command is then be received and interpreted at a receiving device, such as the helm transceiver module 14. Upon receipt at step 106 of the fob ID and the selected fob command at the transceiver 15, the helm transceiver module 14 executes instructions to verify the fob ID at step 108 to confirm that the received fob ID is associated with a permitted fob. Once the fob ID is verified, the helm transceiver module 14 identifies, ID at step 110, the set of commands associated with the selected fob command for the fob. The control module then communicates instructions on the vessel network to execute the set of commands at step 112.

FIG. 4 depicts an exemplary set of steps that may be executed, such as at a configuration control module 18, to collect user input selections of functions and to generate the set of system commands accordingly. The available devices are detected on the vessel network 24 at step 120. A list of available functions for each user-selectable fob command is generated at step 122, such as by matching the available devices with functions from a master list of possible functions as described above. The lists of available functions are displayed at step 124 such that the user can select any one or subset of functions to be associated with each of the various user-selectable fob commands. In certain embodiments, the detection of available devices and generation of the available functions may be performed at the configuration control module 18, which may then communicate the lists to the one or more user interface computers 20, 30, 32. Such communication may be via the vessel network 24 or the remote interface 28, which then display the lists as user-selectable functions. The user selections are received at step 126. For example, the selections may be inputted by the user at one of the user interface computers (e.g. PC 30, smartphone 32, or on-board user interface 20), which may then communicate the selections to the control module generating the set of system commands. Alternatively, the user interface computer may generate the set of system commands and communicate that set to the configuration control module 18, or directly to the helm transceiver module 14. Either way, the set of system commands are generated at step 128 based on the user selections. The set of system commands are communicated to and stored in the helm transceiver module 14 in association with the respective fob ID and fob command, which is represented at step 130. The functionality of the remote control system is thereby configured by the user.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A remote control system for a marine vessel, the system comprising:
   at least one fob, each fob having at least two user inputs each associated with a different user-selectable fob command, wherein the fob is configured to wirelessly transmit a fob identification and a selected fob command in response to user selection of the respective user input;
   a configuration control system configured to:
      detect available devices on the marine vessel to be controlled remotely for the marine vessel;
      generate a list of available functions for at least one user-selectable fob command based on the detected available devices;
      present the list of available functions to the user via a fob configuration user interface such that the user can select one or more functions in the list of available functions;
      identify a system command associated with each selected function so as to configure a set of system commands based on the user-selected functions;
   store the set of system commands in association with the fob identification and the selected fob command; and
   a helm transceiver module on the marine vessel configured to receive the fob identification and the selected fob command from the fob and to effectuate activation or deactivation of the available devices based on the set of system commands.

2. The remote control system of claim 1, wherein detection of available devices on the marine vessel includes detecting available devices communicating on a vessel network of the marine vessel.

3. The remote control system of claim 1, wherein the configuration control system includes a user interface computer communicatively connected to a configuration control module on the marine vessel, and wherein the configuration control module is communicatively connected to the helm transceiver module;

wherein the user interface computer is configured to allow the user to select the set of system commands associated with each user-selectable fob command for each fob identification;

wherein the configuration control module is configured to communicate each set of system commands to the helm transceiver module.

4. The remote control system of claim 3, wherein the user interface computer is a personal computer or a smartphone and communicating with the configuration control module via a vessel network.

5. The remote control system of claim 3, wherein the user interface computer is a personal computer or a smartphone and communicatively connected to the configuration control module via a remote interface.

6. The remote control system of claim 1, wherein the helm transceiver module is configured to recognize fob identifications for at least two permitted fobs and to associate a different set of system commands with each of the user-selectable fob commands from each of the at least two permitted fobs.

7. The remote control system of claim 1, wherein the helm transceiver is configured to communicate instructions to activate or deactivate the available devices via a vessel network based on the set of system commands, wherein the vessel network includes a CAN bus or a wireless network.

8. The remote control system of claim 1, wherein the user-selectable fob commands include each of an unlock command and a lock command;

wherein the set of system commands associated with the unlock command includes at least two or more of a command to deactivate a security system, a command to activate one or more bilge blowers, a command to activate one or more battery switches, a command to activate an air-conditioning system, and a command to unlock one or more cabin doors; and wherein the set of system commands associated with the lock command includes at least two or more of a command to activate the security system, a command to shut down one or more propulsion devices, a command to deactivate one or more bilge blowers, a command to deactivate one or more battery switches, a command to deactivate the air-conditioning system, and a command to lock one or more cabin doors.

9. The remote control system of claim 1, wherein the user-selectable fob commands include a start command, wherein the set of system commands associated with the start command include commands to start all propulsion devices on the marine vessel at once, commands to start all propulsion devices on the marine vessel sequentially, or a command to start a subset of the propulsion devices on the marine vessel.

10. The remote control system of claim 1, wherein the user-selectable fob commands include a lights command, wherein the set of system commands associated with the lights command include at least one of a command to turn on cabin lights, a command to turn on docking lights, and a command to turn on underwater lights.

11. A method of operating a remote control system for a marine vessel, the method comprising:
receiving a fob identification of a fob and a selected fob command associated with a user input on the fob;
detecting available devices on a marine vessel to be controlled remotely for the marine vessel;
generating a list of available functions for at least one user-selectable fob command based on the detected available devices;
presenting the list of available functions to a user via a fob configuration user interface such that the user can select one or more functions in the list of available functions;
identifying a system command associated with each selected function so as to configure a set of system commands;
storing the set of system commands in association with the fob identification and the selected fob command;
receiving the fob identification and the selected fob command at a helm transceiver module on the marine vessel from the fob; and
activating or deactivating the available devices based on the set of system commands.

12. The method of claim 11, wherein detecting available devices on the marine vessel includes detecting available devices communicating on a vessel network of the marine vessel.

13. The method of claim 11, wherein the user-selectable fob commands include each of an unlock command and a lock command, and further comprising:
if a security system is detected, presenting a user-selectable command to deactivate a security system in association with the unlock command and/or presenting a user-selectable command to activate the security system in association with the lock command; and
if a cabin door is detected, presenting a user-selectable command to unlock the cabin door in association with the unlock command and/or presenting a user-selectable command to lock the cabin door in association with the lock command.

14. The method of claim 11, wherein the user-selectable fob commands include each of a first command and a second command, and further comprising:
if a battery switch is detected, presenting a user-selectable command to activate the battery switch in association with the first command and/or presenting a user-selectable command to deactivate the battery switch in association with the second command.

15. The method of claim 11, wherein the user-selectable fob commands include each of a first command and a second command, and further comprising:
if a propulsion device is detected, presenting a user-selectable command to start the propulsion device in association with the first command and/or presenting a user-selectable command to shut down the propulsion device in association with the second command.

16. The method of claim 11, wherein the user-selectable fob commands include each of a first command and a second command, and further comprising:
if a bilge blower is detected, presenting a user-selectable command to activate the bilge blower in association with the first command and/or presenting a user-selectable command to deactivate the bilge blower in association with the second command; and
if an air conditioning system is detected, presenting a user-selectable command to activate an air-conditioning system in association with the first command and/or presenting a user-selectable command to deactivate the air-conditioning system in association with the second command.

17. The method of claim 12, wherein the user-selectable fob commands include a start command, and further comprising:
detecting two or more propulsion devices on the vessel network;
presenting a user-selectable command to start all propulsion devices on the marine vessel at once, a user-selectable command to start all propulsion devices on the marine vessel sequentially, and a user-selectable command to start one of the propulsion devices.

18. The method of claim 17, further comprising:
detecting at least a third propulsion device on the vessel network;
presenting a user-selectable command to start an inner subset of the at least three propulsion devices, and a user-selectable command to start an outer subset of the at least three propulsion devices.

19. The method of claim 11, wherein the steps of detecting available devices and generating the list of available functions is performed by a configuration control module on the marine vessel, and further comprising:
communicating the list of available functions from the configuration control module to a user interface computer so that it can be presented thereon.

20. The method of claim 19, further comprising:
receiving the user selections from the user interface computer at the configuration control module; and
wherein the configuration control module generates the set of system commands associated with each user-selectable fob command for each fob identification based on the user selections and provides the set of system commands to the helm transceiver module.

* * * * *